(12) United States Patent
Huntzinger et al.

(10) Patent No.: US 11,630,011 B2
(45) Date of Patent: Apr. 18, 2023

(54) MICRO-MOLDED FLUID PRESSURE SENSOR HOUSING

(71) Applicant: Honeywell International Inc., Charlotte, NC (US)

(72) Inventors: Bradley Huntzinger, Columbus, OH (US); Richard Wade, Worthington, OH (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/393,681

(22) Filed: Aug. 4, 2021

(65) Prior Publication Data
US 2021/0364378 A1 Nov. 25, 2021

Related U.S. Application Data

(63) Continuation of application No. 16/448,487, filed on Jun. 21, 2019, now Pat. No. 11,118,990.

(51) Int. Cl.
*G01L 9/00* (2006.01)
*G01L 19/00* (2006.01)

(52) U.S. Cl.
CPC ........ *G01L 9/0052* (2013.01); *G01L 19/0046* (2013.01)

(58) Field of Classification Search
CPC ............... G01L 9/0052; G01L 19/0046; G01L 19/0007; G01L 19/0038; G01L 19/147;
(Continued)

(56) References Cited

U.S. PATENT DOCUMENTS

| 4,770,045 A | 9/1988 | Nakagawa et al. |
| 5,184,107 A | 2/1993 | Maurer |

(Continued)

FOREIGN PATENT DOCUMENTS

| CN | 1223720 A | 7/1999 |
| CN | 101454644 A | 6/2009 |

(Continued)

OTHER PUBLICATIONS

CN Office Action dated Apr. 24, 2022 for CN Application No. 202010570650.

(Continued)

*Primary Examiner* — Francis C Gray
(74) *Attorney, Agent, or Firm* — Alston & Bird LLP

(57) ABSTRACT

A micro pressure sensor includes a sense die mounted on a substrate, a ring structure encircling the sense die, and a silicone material is overmolded to an exterior of the ring structure to form a seal with the ring structure and fills an interior of the ring structure. The ring structure has one or more legs at bottom side, which are snap fitted to the substrate through mating holes such that the ring structure encircles the sense die; and a top surface of the silicone material receives the external pressure and transmits the external pressure to the sense surface of the sense die to generate an output signal on the sense die, wherein a processor converts the output signal into a pressure reading. The pressure-transmitting media transmits a received external pressure to the sense surface of the sense die to generate an output signal from the sense die, wherein a processor converts the output signal into a pressure reading.

19 Claims, 7 Drawing Sheets

(58) Field of Classification Search
CPC ......... G01L 19/143; G01L 9/02; G01L 19/00; G01L 19/141
See application file for complete search history.

(56) References Cited

U.S. PATENT DOCUMENTS

| | | | |
|---|---|---|---|
| 5,461,922 A | 10/1995 | Koen | |
| 8,051,719 B2 * | 11/2011 | Bigliati | G01L 9/0052 73/756 |
| 8,129,624 B2 | 3/2012 | Willner et al. | |
| 2006/0048580 A1 * | 3/2006 | Vogler | G01L 19/0084 73/706 |
| 2014/0341225 A1 | 11/2014 | Subramanian et al. | |
| 2016/0205954 A1 | 7/2016 | Lindee et al. | |
| 2016/0209286 A1 * | 7/2016 | Kaneko | G01L 13/025 |
| 2017/0241852 A1 | 8/2017 | Wade | |
| 2017/0326487 A1 | 11/2017 | Bratek et al. | |
| 2018/0087992 A1 | 3/2018 | Osawa et al. | |
| 2018/0149539 A1 * | 5/2018 | Osawa | G01L 19/0645 |
| 2018/0306660 A1 | 10/2018 | Wade et al. | |
| 2018/0335360 A1 * | 11/2018 | Bentley | G01L 19/0654 |
| 2019/0187017 A1 | 6/2019 | Spanevello | |
| 2019/0285496 A1 * | 9/2019 | Takimoto | G01L 19/148 |

FOREIGN PATENT DOCUMENTS

| | | |
|---|---|---|
| CN | 101799344 A | 8/2010 |
| CN | 101957245 A | 1/2011 |
| CN | 201852665 U | 6/2011 |
| CN | 102589753 A | 7/2012 |
| CN | 102692295 A | 9/2012 |
| CN | 105236343 B | 7/2017 |
| CN | 107084806 A | 8/2017 |
| CN | 107144391 A | 9/2017 |
| CN | 107543650 A | 1/2018 |
| CN | 107677299 A | 2/2018 |
| CN | 207964153 U | 10/2018 |
| CN | 108871662 A | 11/2018 |
| EP | 3048434 A2 | 7/2016 |
| EP | 3193148 A1 | 7/2017 |
| EP | 3404392 A1 | 11/2018 |
| JP | H07294358 A | 11/1995 |
| JP | 2010-256187 A | 11/2010 |
| WO | 2007/051779 A1 | 5/2007 |

OTHER PUBLICATIONS

English Translation of CN Office Action dated Apr. 24, 2022 for CN Application No. 202010570650.
Intention to grant dated Jun. 1, 2022 for EP Application No. 20180635.
Non-Final Rejection dated Jan. 11, 2021 for U.S. Appl. No. 16/448,487.
Notice of Allowance and Fees Due (PTOL-85) dated May 19, 2021 for U.S. Appl. No. 16/448,487.
Extended European Search Report issued in European Application No. 20180635.3 dated Nov. 18, 2020, 9 pages.
Office Action issued in Chinese Application No. 202010570650.5 dated Aug. 31, 2021, 14 pages.
Decision to grant a European patent received for European Application No. 20180635.3, dated Oct. 13, 2022, 2 pages.
3rd Office Action for CN Application No. 202010570650.5 dated Nov. 1, 2022 w/English translation (19 pages).
European Search Report dated for EP Application No. 22196230.1 dated Dec. 19, 2022 (8 pages).
CN Application No. 20201057650.5 Notice of Allowance dated Jan. 20, 2023 w/English translation (7 pages).

* cited by examiner

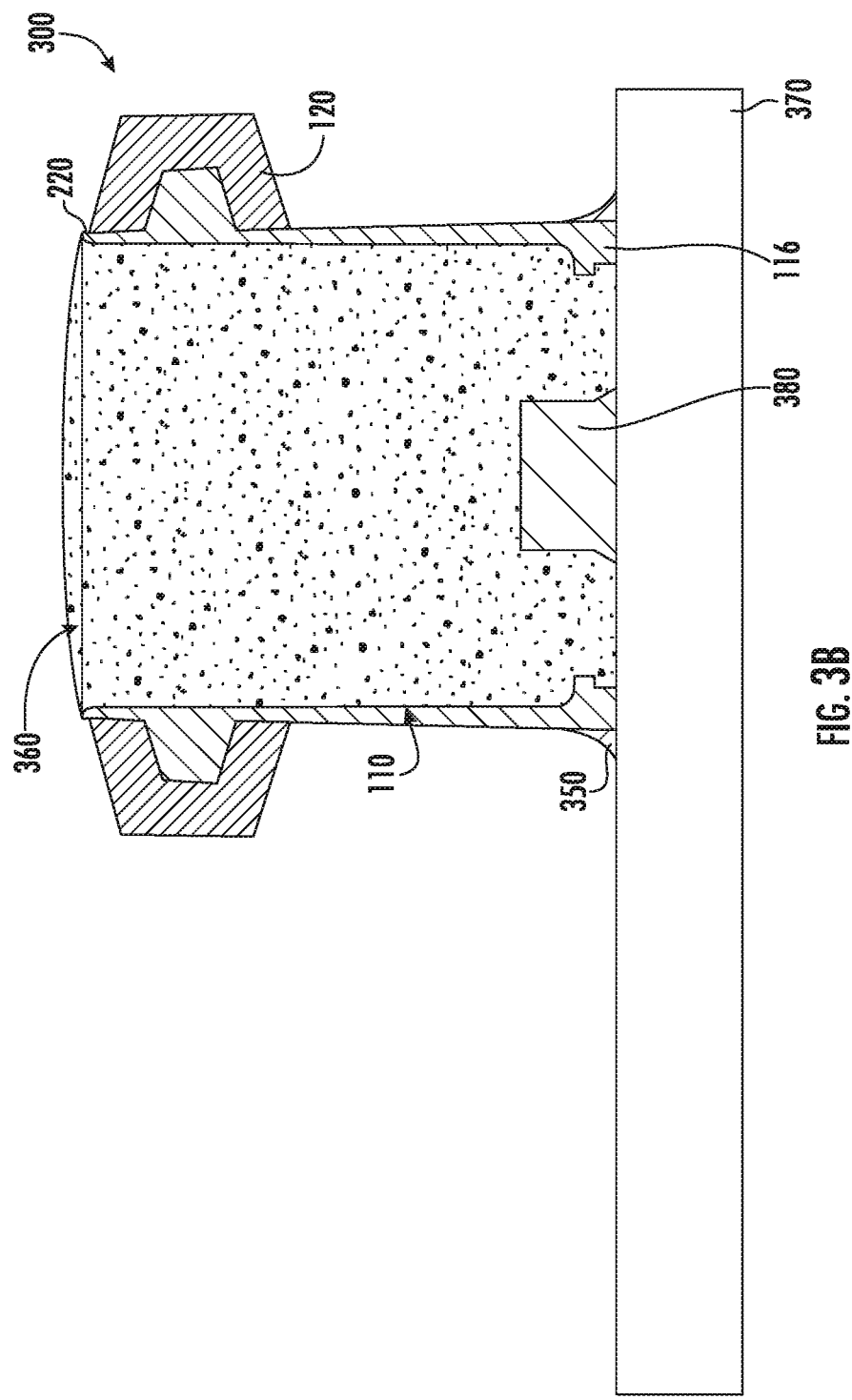

MICRO-MOLDED FLUID PRESSURE SENSOR HOUSING

CROSS REFERENCE TO RELATED APPLICATION

This application is a continuation of, and claims the benefit of priority to U.S. application Ser. No. 16/448,487 entitled MICRO-MOLDED FLUID PRESSURE SENSOR HOUSING filed on Jun. 21, 2019, the entirety of which is incorporated by reference herein.

FIELD OF THE INVENTION

The present disclosure relates generally to fluid pressure sensors, and more particularly, to disposable fluid pressure sensor.

BACKGROUND OF THE INVENTION

In many commercial areas, it is necessary to use disposable sensor devices. This is especially true with the growing demand for disposable medical devices. However, these disposable sensor devices must generally be produced in accordance with low cost and high volume production methodologies to justify the expense associated with disposing of each sensor device.

Conventional pressure sensors, for example, as described in U.S. Pat. Nos. 5,184,107, 8,129,624 and PCT Publication no. WO2007/051779, are characterized by relatively complicated fabrication processes, which leads to relatively expensive sensors which are not suitable for usage within disposable medical devices.

Based on the foregoing, a need exists for an improved technique to manufacture compact pressure sensors for low cost and reliable sensor devices.

BRIEF SUMMARY OF THE INVENTION

A disposable sensor is disclosed for pressure measurement. According to the embodiments, the disposable sensor includes a sense die configured to output an electric signal after receiving an external pressure on a sense surface; a printed circuit board (PCB) electrically connected to the sense die, wherein the PCB provides power and signal processing for the sense die; a ring structure encompassing the sense die, wherein the ring structure has one or more legs at its bottom side, wherein the one or more legs are snap fitted to the PCB through mating holes; and a silicone material disposed over top side of the ring structure, forming a first portion over the ring structure, and a second portion filling an inside of the ring structure, wherein the first portion receives the external pressure, and the second portion transmits the external pressure to the sense surface of the sense die.

According to the embodiments, a method of building a disposable pressure sensor includes: providing a sense die on a printed circuit board (PCB), wherein the sense die is configured to output an electric signal after receiving an external pressure, wherein the PCB provides power and signal processing to the sense die; providing a ring structure module with one or more flexible legs at bottom side, completed by injecting a silicone material over the ring structure, wherein the silicon material overmolded to an exterior to form a seal of the ring structure top and fills within an interior of the ring structure; during assembly, the plurality of legs are inserted into the plurality of mating holes such that the ring structure encircles the sense die. In operation, a top surface of the silicone material receives the external pressure and transmits the external pressure to the sense surface of the sense die to generate an output signal on the sense die, wherein a processor converts the output signal into a pressure reading.

inserting the one or more legs through mating holes in the PCB, wherein the ring structure encompasses the sense die; and disposing silicone material over the top side of the ring structure, forming a first portion silicone material over the ring structure and a second portion silicone material inside the ring structure and resting on the sense die; wherein the first portion silicone material receives the external pressure, and the second portion silicone material transmits the external pressure to the sense die.

Preferably, the silicone material and the ring structure are opaque materials.

Preferably, the silicone material is formed from mixing two silicone rubbers.

Preferably, the sense die is a silicon chip outfitted with piezoresistive sensors arranged in Wheatstone bridge circuit.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed.

FIG. 3B is a cross-sectional view of the micro pressure sensor assembly according to FIG. 3A;

DETAILED DESCRIPTION OF THE INVENTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. The following brief definition of terms shall apply throughout the application:

The term "comprising" means including but not limited to, and should be interpreted in the manner it is typically used in the patent context. The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment). If the specification describes something as "exemplary" or an "example," it should be understood that refers to a non-exclusive example; The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Configurations encompassing a pressure sense die provided together with an electronic platform like a printed circuit board (PCB) as discussed herein may be directly coupled into a micro molded structure to provide a sensor. Embodiments discussed herein allow for a single sense die directly connect into a molded micro ring which is over molded with a silicone seal.

Figure 1:
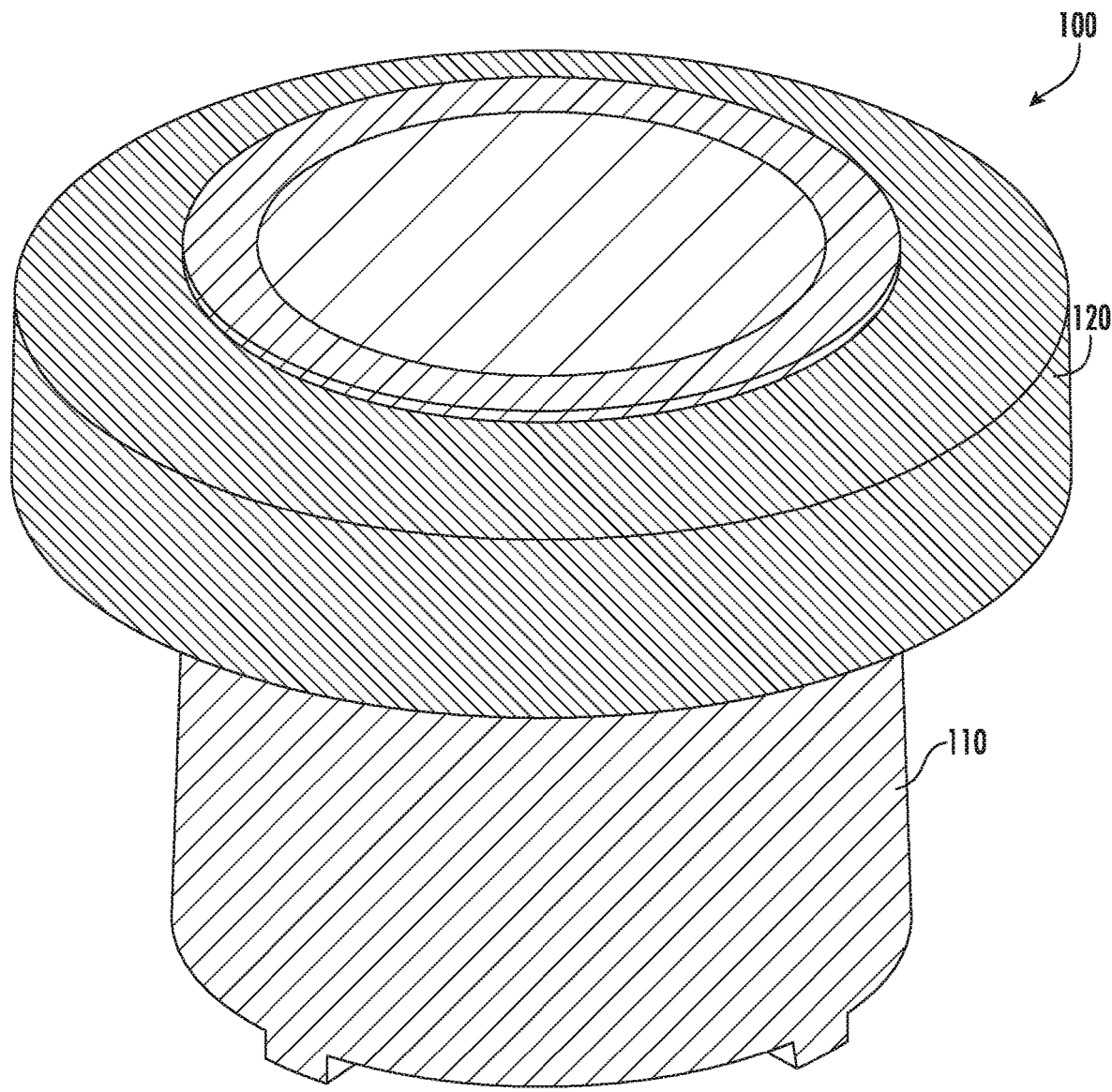
FIG. 1 is a perspective view of a molded ring structure for a micro pressure sensor according to certain embodiments.
Figure 2:
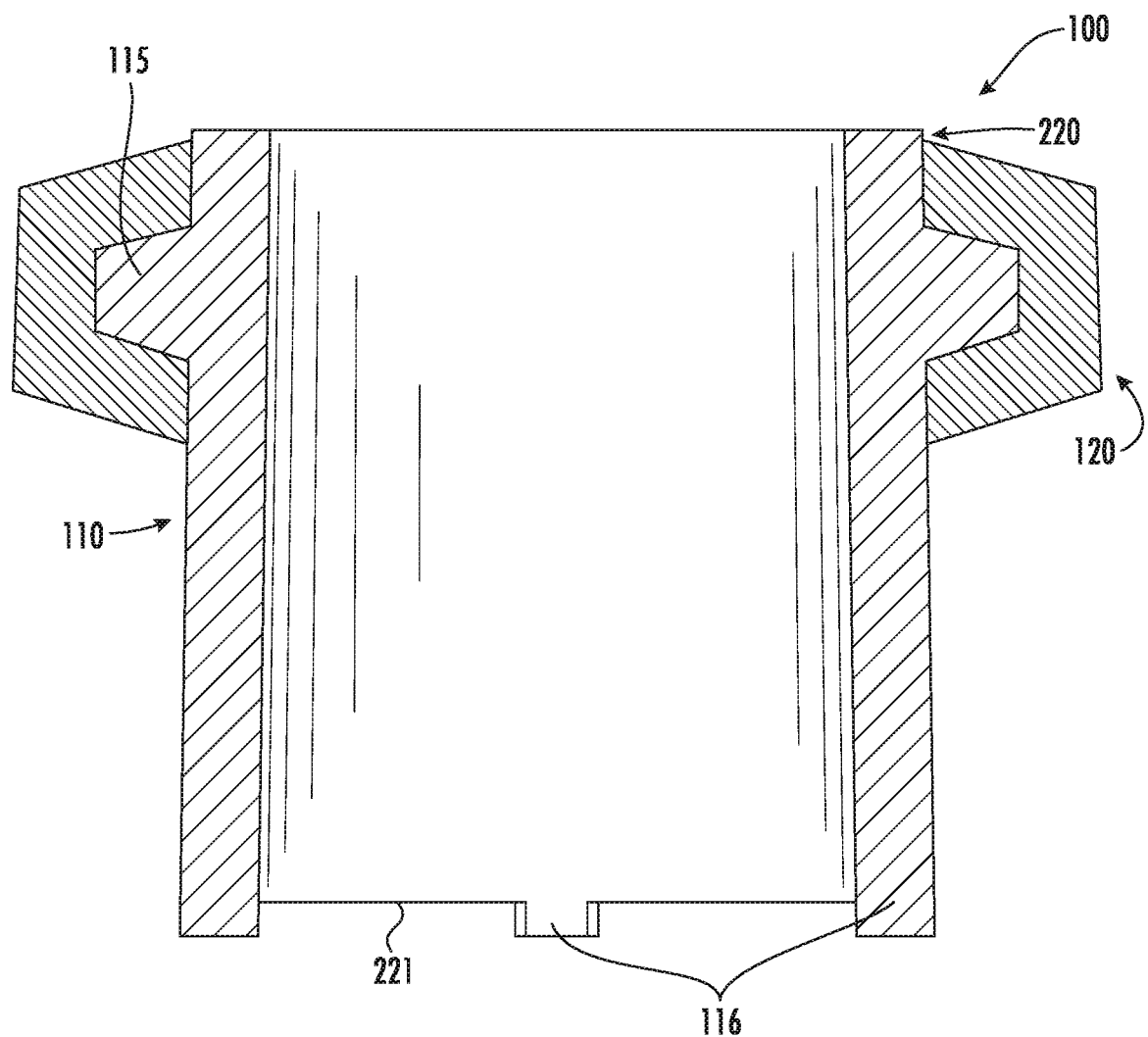
FIG. 2 is a cross-sectional view of the molded ring structure in FIG. 1.
Figure 3A:
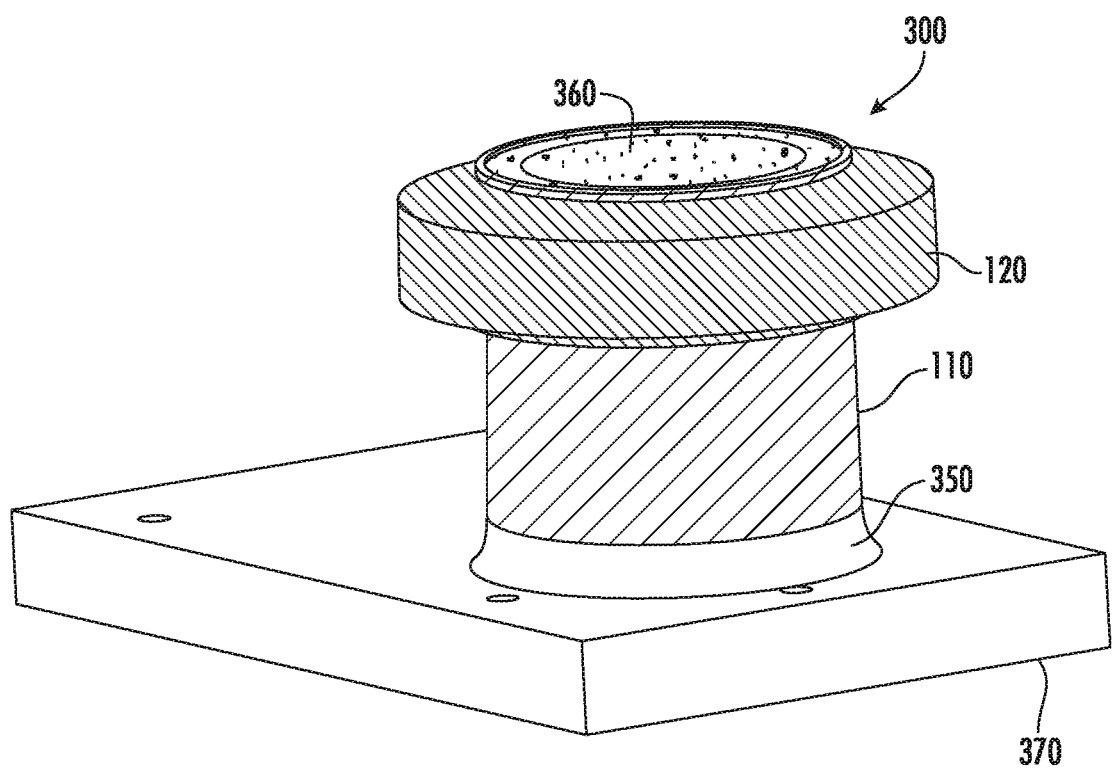
FIG. 3A shows a perspective view of a micro pressure sensor and PCB assembly directly coupled to the molded ring structure in FIG. 1 with adhesives.

Certain embodiments of the pressure sensor incorporate a molded ring-like housing and a pressure sense die on PCB attached to each other with adhesives. FIGS. 1, 2, 3A and 3B illustrate different views of the sensor applying the adhesives coupling type, according to an embodiment of the disclosure. FIG. 1 is a perspective view of a molded ring structure assembly 100 for direct coupling with a micro pressure sensor using adhesives. FIG. 2 is a cross-sectional view of the molded ring structure of FIG. 1. FIG. 3A shows a perspective view and FIG. 3B illustrates a cross-sectional view of the micro pressure senses die and PCB assembly directly coupled to the molded ring structure in FIG. 1 with adhesives.

As illustrated in FIG. 1, the molded ring structure 100 may be a part of a pressure sensor as discussed herein. The molded ring structure 100 as illustrated in FIG. 1 comprises a tubular housing defining at least one sidewall 110 and a seal structure 120 surrounding an outer surface of the tubular housing for creating a seal between the molded ring structure 100 and a fluid conduit (e.g., containing a fluid for pressure measurement thereof). The at least one sidewall 110 of the tubular housing defines an at least substantially smooth interior surface of the tubular housing surrounding an interior of the tubular housing, and an at least substantially smooth exterior surface of the tubular housing surrounding an exterior of the tubular housing. When configured as a portion of a pressure sensor, the molded ring structure is configured for enclosing a pressure sense die within the interior of the tubular housing, surrounded by the at least one sidewall 110. As shown in FIG. 1, the molded ring structure 100 may have a circular tubular shape (characterized by a diameter and a length), although other configurations may be suitable for certain implementations. For example, the tubular housing may have a rectangular cross-section (having four sidewalls 110), a triangular cross-section (having three sidewalls 110), a hexagonal cross-section (having six sidewalls 110), and/or the like.

The sidewalls of the tubular housing may comprise a molded plastic material (e.g., Polysulfone, Polycarbonate, Acrylic, Stainless Steel, etc.), however it should be understood that other materials such as Teflon, glass, etc. may be used in certain embodiments. To prevent light from penetrating through the at least one sidewall 110 onto the sense die (discussed below), the at least one sidewall 110 of certain embodiments comprises opaque materials. Embodying the at least one sidewall 110 of the tubular housing as a molded plastic ring has the advantages of a low material cost and ease of manufacturing. As non-limiting examples, the at least one sidewall 110 of the circular tubular housing shown in FIG. 1 may have a height between about 1 mm to 5 mm, an internal diameter (measured across an interior diameter defined by the interior surface of the at least one sidewall 110) range between about 1 mm to 4 mm (e.g., at least about 1.5 mm), an outer diameter (measured across an exterior diameter defined by the exterior surface of the at least one sidewall 110) range between about 2 mm to 6 mm, and a sidewall 100 thickness between about 0.5 mm to 1 mm.

The seal structure 120 encircling an exterior surface of the at least one sidewall 110 of the tubular housing is located proximate an upper end of the tubular housing (e.g., closer to the upper end of the tubular housing than an opposite lower end of the tubular housing) and forms a protruding barrier between the upper end of the molded ring structure 100 and the lower end of the molded ring structure 100. In certain embodiments, the seal structure 120 comprises a resilient material configured to form a fluid seal with an at least substantially smooth surface of a fluid conduit. For example, the seal structure 120 may comprise rubber, silicone, or other resilient polymer materials.

Shown in FIG. 2 is a cross-sectional view of the molded ring structure 100 shown in FIG. 1. In the illustrated embodiment, the ring structure 100 defines a ring top edge 220 at the upper end of the at least one sidewall 110 and a protruding seal structure 120. The hollow interior of the molded ring structure 100 (defined within the interior of the at least one sidewall 110) accommodates a sense die assembly which will be illustrated in the next figures. As shown in FIG. 2, the at least substantially smooth exterior surface of the at least one sidewall 110 defines an engagement protrusion 115 configured to maintain connection between the at least one sidewall 110 and the seal structure 120. In the illustrated embodiment of FIG. 2, the engagement protrusion 115 entirely encircles the at least one sidewall 110 to facilitate connection between the at least one sidewall 110 and the seal structure 120. In the illustrated embodiment, the engagement protrusion 115 has a cross-sectional shape corresponding to the cross-sectional shape of the seal structure 120. As a non-limiting example as shown in FIG. 2, the seal structure 120 has a trapezoidal cross-sectional shape surrounding an engagement protrusion 115 having a corresponding trapezoidal cross-sectional shape. However it should be understood that the engagement protrusion 115 need not have a cross-sectional shape corresponding to the shape of the seal structure 120. As non-limiting examples, the engagement protrusion 115 may have a triangular cross-sectional shape, a rectangular cross-sectional shape (or multiple parallel rectangular cross-sectional shapes), and/or the like, to secure a trapezoidal seal structure 120 around an exterior surface of the at least one sidewall 110. As illustrated in FIG. 2, the seal structure 120 may be positioned adjacent the top edge 220 of the at least one sidewall 110.

As also shown in FIG. 2, a lower edge 221 of the at least one sidewall 110 defines one or more spacer protrusions 116 extending below a lower edge 221 of the at least one sidewall 110. As discussed in greater detail herein, the one or more spacer protrusions 116 may be configured as integrated calibration components to maintain an at least substantially uniform adhesive thickness between the lower edge 221 of the at least one sidewall 110 and a surface of a substrate (e.g., a Printed Circuit Board (PCB)) on which the molded ring structure 100 is placed. In the illustrated embodiment, the at least one sidewall 110 defines four spacer protrusions 116 that are at least substantially equally spaced around the perimeter of the at least one sidewall 110, however greater or fewer spacer protrusions 116 may be utilized in other embodiments.

FIG. 3A shows a perspective view and FIG. 3B shows a cross-sectional view of a micro pressure sensor 300 comprising a molded ring structure 100 according to one embodiment. As shown in FIGS. 3A and 3B, the micro pressure sensor 300 comprises a substrate (e.g., a PCB) assembly adhered (e.g., via adhesive 350) to a molded ring structure 100 as illustrated in FIGS. 1 and 2, according to some embodiments. A pressure conducting material, such as silicone material 360 shown in FIGS. 3A-3B is dispensed into the hollow interior of the of the molded ring structure 100, guided by the interior surface of the at least one sidewall 110. As illustrated in FIG. 3B, the substrate platform 370 has a sense die 380 disposed thereon (within an interior of the molded ring structure 100) and encompasses power supply and/or signal processing circuitry for the sense die 380. The sense die 380 may be a silicon chip outfitted with piezoresistive sensors arranged in Wheatstone bridge circuit. The target pressure range may be from −10 PSI to 200 PSI. The ring structure 100 is at least substantially centered relative to the sense die 380 and is seated on a surface of the substrate platform 370. As discussed above, the spacing protrusions 116 may be positioned against the surface of the substrate platform 370, and adhesive 350 may be used to secure the lower edge 221 of the at least one sidewall 100 relative to the substrate. As illustrated in FIGS. 3A-3B, the adhesive 350 surrounds the entire perimeter of the molded ring structure 100 so as to provide a fluid-tight seal between the molded ring structure 100 and the surface of the substrate. A silicone material 360 is dispensed into the molded ring structure 100 and fills the interior of the molded ring structure 100, covering the sense die 380 and a part of the substrate positioned within the footprint of the molded ring structure 100. Silicone 360 may be a mixture of the two-part silicone rubber type and may be an opaque material to prevent light from reaching the sense die 380, which may induce noise in a pressure signal generated by the sensor.

In use, the micro pressure sensor 300 may be integrated into a fluid conduit, a fluid container, and/or the like to measure the fluid pressure therein. The micro pressure sensor 300 may be configured such that the molded ring structure 100 extends through a wall of the fluid conduit and/or fluid container, such that an upper end of the molded ring structure 100 is positioned within the fluid-containing interior of the fluid conduit, fluid container, and/or the like, with the remainder of the micro pressure sensor 300 is positioned external to the fluid-containing conduit, container, and/or the like. In such embodiments, the seal structure 120 is configured to create a fluid-tight seal with the wall of the fluid containing conduit, container, and/or the like, to prevent undesired fluid leakage around the exterior of the molded ring structure 100.

Figure 4:
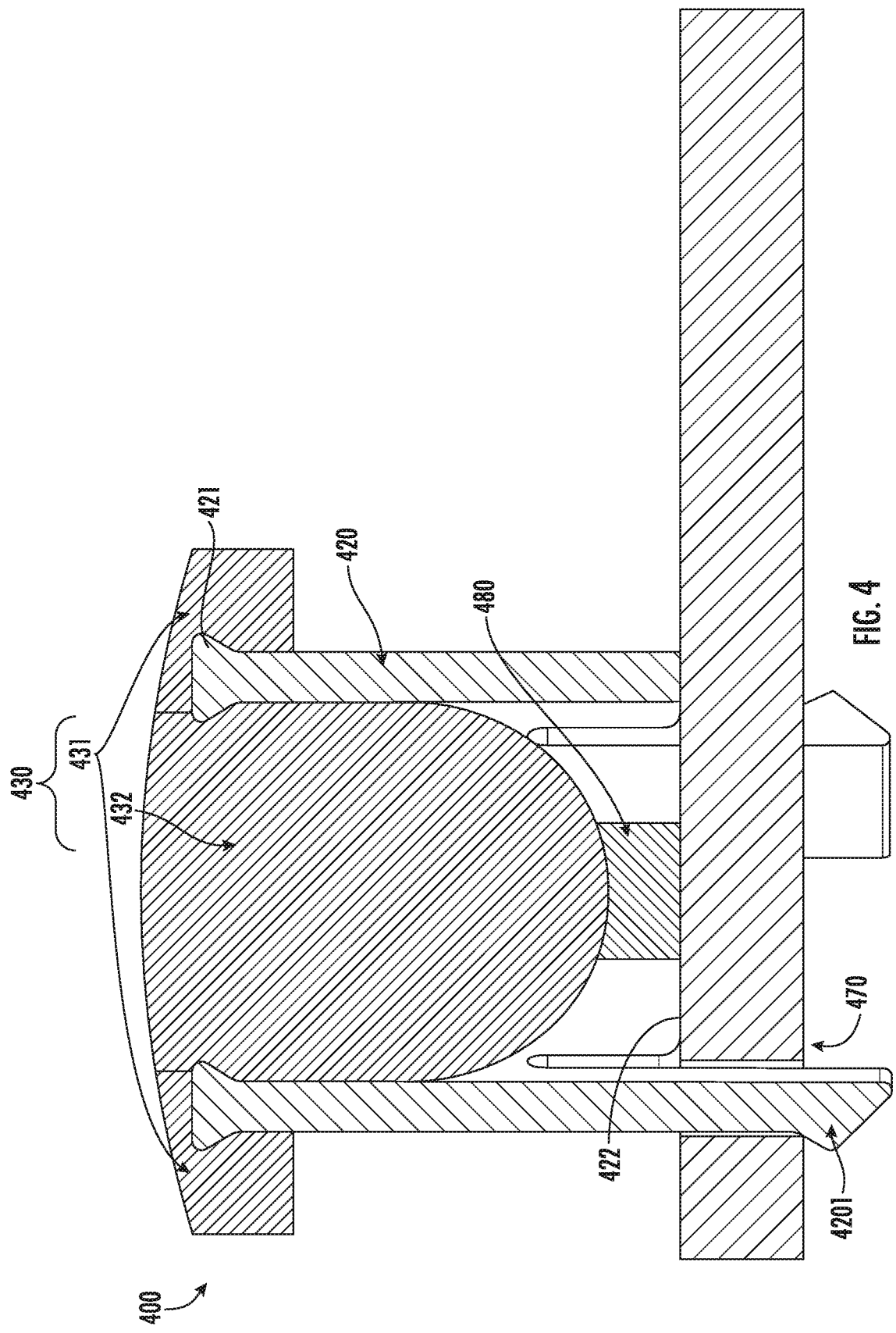
FIG. 4 shows a cross-sectional view of another micro pressure sensor and PCB assembly in direct coupling to the ring structure using over molded silicone materials, according to another embodiment.

FIG. 4 illustrates a cross-sectional view 400 of another micro pressure sensor 400. As shown therein, the micro pressure sensor 400 comprises a substrate (e.g., PCB) directly coupled with a molded ring structure 500. In the illustrated embodiment of FIG. 4, the molded ring structure 500 comprises a tubular housing defining at least one sidewall 420 and a molded pressure transmitting media (e.g., a molded silicone component) 430 having a first portion 431 positioned external to the molded ring structure 500 and adjacent an upper end of the molded ring structure 500 and a second portion 432 positioned within an interior of the molded ring structure 500 (e.g., to contact a pressure sense die 480 and to transmit pressure to the pressure sense die 480). The at least one sidewall 420 of the tubular housing defines an interior surface (e.g., having a defined roughness) of the tubular housing surrounding an interior of the tubular housing, and a smooth exterior surface of the tubular housing surrounding an exterior of the tubular housing. When configured as a portion of a pressure sensor (as configured in FIG. 4), the molded ring structure 500 is configured for enclosing a pressure sense die 480 within the interior of the tubular housing, surrounded by the at least one sidewall 420. As shown in FIG. 4, the molded ring structure 500 may have a circular tubular shape (characterized by a diameter and a length), although other configurations may be suitable for certain implementations. For example, the tubular housing may have a rectangular cross-section (having four sidewalls 420), a triangular cross-section (having three sidewalls 420), a hexagonal cross-section (having six sidewalls 420), and/or the like.

The sidewalls of the tubular housing may comprise a molded plastic material (e.g., Polysulfone, Polycarbonate, Acrylic, Stainless Steel, etc.), however it should be understood that other materials such as Teflon, glass, etc. may be used in certain embodiments. To prevent light from penetrating through the at least one sidewall 420 onto the sense die (discussed below), the at least one sidewall 420 of certain embodiments comprises opaque materials. Embodying the at least one sidewall 420 of the tubular housing as a molded plastic ring has the advantages of a low material cost and ease of manufacturing.

As shown in FIG. 4, the at least one sidewall defines an upper end 421 and an opposite lower end 422 configured to contact a surface of a substrate 470. The tubular housing encircles the pressure sense die 480 premounted on the substrate 470. The upper end 421 of the at least one sidewall is enlarged so as to securely engage the pressure transmitting media 430 (e.g., via an interference fit between the upper end 421 of the at least one sidewall 420 and the pressure transmitting media 430). By maintaining an interference fit between the at least one sidewall and the pressure transmitting media 430, the pressure transmitting media may desirably remain in contact with the pressure sense die 480, as illustrated in FIG. 4, while preventing fluid from directly contacting the pressure sense die 480. Moreover, the at least one sidewall 420 further defines a plurality of legs 4201 extending away from the lower end 422 of the at least one sidewall 420. The plurality of legs 4201 are defined as flexible tabs configured to engage apertures extending through the substrate 470 to create a snap fit between the substrate 470 and the plurality of legs 4201. A protruding foot at the tip of each leg 4201 provides an interference fit lock function. For example, each leg 4201 and corresponding foot are flexed away from a neutral position while being pressed through the aperture of the substrate 470. Once the foot of each leg 4201 is fully clear of the substrate 470, the legs elastically return to the neutral position, thereby creating an interference fit between the foot of each leg 4201 and the substrate 470. Although illustrated as comprising a snap-fit attachment mechanism via the illustrated legs 4201, it should be understood that in certain embodiments, the tubular housing may be adhered relative to a substrate, such as via the adhesive mechanism.

According to one embodiment, a ring structure module is made with one or more flexible legs at bottom side, completed by injecting a silicone material over the ring structure. The silicon material overmolded to an exterior to form a seal of the ring structure top and fills within an interior of the ring structure; during assembly, the plurality of legs are inserted into the plurality of mating holes such that the ring structure encircles the sense die. In operation, a top surface of the silicone material receives the external pressure and transmits the external pressure to the sense surface of the sense die to generate an output signal on the sense die, wherein a processor converts the output signal into a pressure reading.

As non-limiting examples, the at least one sidewall 420 of the circular tubular housing shown in FIG. 4 may have a height between about 2 mm to 3 mm. Moreover, as a non-limiting example, the illustrated embodiment of FIG. 4 defines three legs 4201 extending away from the lower end 422 of the at least one side wall 420, however it should be understood that more or less legs 4201 may be provided in certain embodiments to provide a secure fit between the molded ring structure 500 and the substrate 470. The substrate platform 470 has a sense die 480 disposed thereon (within an interior of the molded ring structure 500) and encompasses power supply and/or signal processing circuitry for the sense die 480. The sense die 480 may be a silicon chip outfitted with piezoresistive sensors arranged in Wheatstone bridge circuit. The target pressure range may be from −10 PSI to 200 PSI. The ring structure 500 is at least substantially centered relative to the sense die 480 and seated on the substrate 470 by locking the legs 4201 through apertures of the substrate.

In the illustrated embodiment of FIG. 4, the pressure transmitting media 430 is formed over the upper end 421 of the at least one sidewall 420. According to certain embodiments, a silicone material is molded over the upper end 421 of the at least one sidewall 420 to form at least a portion of the pressure transmitting media 430. The pressure transmitting media 430 is a resilient, solid material when molded (such that, once cured, the pressure transmitting media 430 does not flow). In certain embodiments, the entirety of the pressure transmitting media 430, including the first portion 431 and the second portion 432 may be integrally molded. In other embodiments, the first portion 431 and the second portion 432 may be separately formed and joined together when constructing the molded ring structure 500.

In use, the micro pressure sensor 400 may be integrated into a fluid conduit, a fluid container, and/or the like to measure the fluid pressure therein. The micro pressure sensor 400 may be configured such that the molded ring structure 500 extends through a wall of the fluid conduit and/or fluid container, such that an upper end of the molded ring structure 500 is positioned within the fluid-containing interior of the fluid conduit, fluid container, and/or the like, with the remainder of the micro pressure sensor 400 is positioned external to the fluid-containing conduit, container, and/or the like. Accordingly, the pressure transmitting medial 430 comprises a first portion 431 located over the at least one sidewall 420, and a second portion 432, such that the second portion 432 defines a fluid interface between the pressure sensor 400 and a fluid containing conduit, container, and/or the like. In such embodiments, the second portion 432 of the pressure-transmitting media operates as a seal structure configured to create a fluid-tight seal with the wall of the fluid containing conduit, container, and/or the like, to prevent undesired fluid leakage around the exterior of the molded ring structure 500 and/or into the interior of the molded ring structure 500. Fluid may contact a surface of the second portion 432 and apply a pressure thereto. That pressure is transmitted through the second portion 432 of the pressure-transmitting media positioned within the interior of the molded ring structure 500, until the pressure is transmitted to the pressure sense die 480. Because the pressure-transmitting media 432 acts as a seal against fluid entry into the interior of the molded ring structure 500, the fluid does not contact the pressure sense die 480 directly, however fluid pressure may be sensed through pressure transmissions through the pressure-transmitting media 432. The output signal from the sense die 480 may have a flip chip design which mounts the sense die facing down and has a back fill to contact the over-molded component, or via wire bonding connections to circuitry disposed on the substrate 470 or connect from a set of through silicon vias (TSVs) made in a silicon based sense die.

With continued reference to FIG. 4, the pressure-transmitting media may be an opaque silicone material over molded on to the upper end 421 of the at least one sidewall 420. The tubular housing defined by the at least one sidewall 420 may have an internal diameter between about 1 mm to 3 mm. Due at least in part to this small internal diameter, the highly viscous silicone material flowing into the interior of the tubular housing during the molding process forms and solidifies into an inverted dome 432 lower profile having a lower-most end at the exposed sensing top surface of the sense die 480. Pressure from a sensing target (e.g., a fluid) exerted on the top surface of the molded pressure-transmitting media 430 causes corresponding deflection of the pressure-transmitting media 430 to press on the pressure sense die 480, thereby inducing a pressure output signal from the pressure sense die 480.

The compact pressure sensors disclosed above will find many applications, for example, where disposable medical or biological sensors are in high demand. For example, pressure, flow rate type of sensors for body fluids (blood, urine, etc.) will be good candidates for these sensors.

Sensors, such as those discussed in reference to FIGS. 1-4 may be fabricated in accordance with the techniques described in FIG. 5A and FIG. 5B below.

Figure 5A:
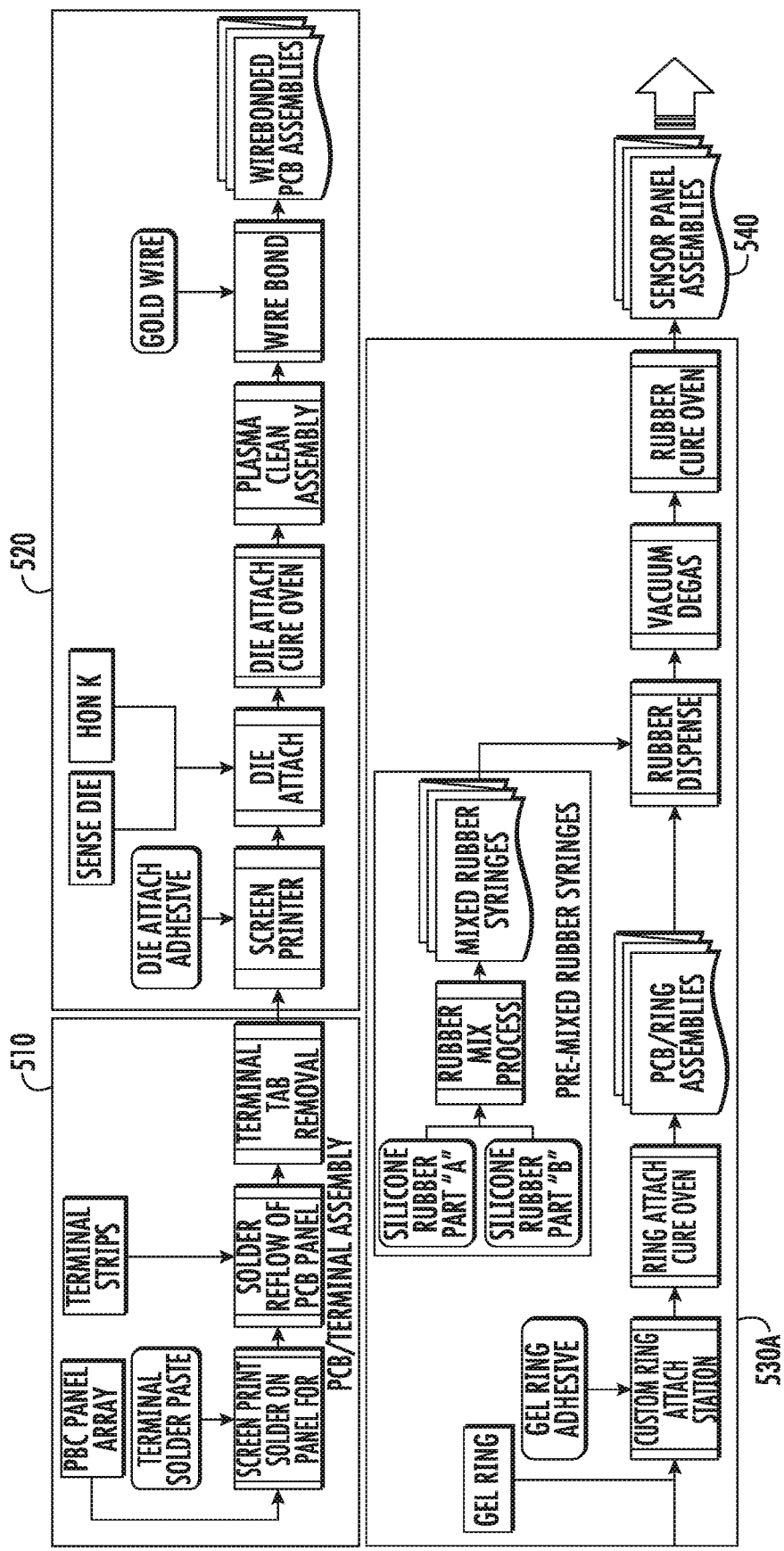
FIG. 5A shows a schematic block diagram of the process flow for fabricating an adhesive coupled micro pressure sensor according to FIGS. 3A and 3B.

FIG. 5A illustrates a schematic block diagram of the process flow for fabricating an adhesive coupled micro pressure sensor according to FIGS. 3A and 3B. The process flow includes four major blocks:

Block 510 illustrates the process assembling an example substrate with terminal;

Block 520 illustrates the process of attaching a sense die relative to the substrate;

Block 530A illustrates the process of securing the seal structure (also referred to as a "gel ring") with the tubular housing; and Block 540 illustrates the process of packaging the sensor In fabricating the pressure sensor encompassing a seal structure, attaching the seal structure to the sensor presents one challenging step. As reflected in Block 530A, one example technique is using adhesives to bond the seal structure with the tubular housing. Referring to FIG. 5A, block 510 represents a process to prepare a substrate platform (e.g., a PCB platform). As illustrated in FIG. 5A, the PCB platform may be patterned into circuitry arrays using a pre-prepared solder paste as the conductive network—a process referred to as screen print. Heating the patterns on PCB afterwards triggers reflow of the solder paste. As a result the extra solder at edge terminals are stripped off during the reflow process, followed by removing the terminal tabs. The PCB assembly is now ready for next step of sense die attachment.

Block 520 illustrates an example process of preparing sense dies and attaching the sense dies to a PCB assembly. As illustrated at block 520, die attach adhesive is coated on the PCB array at predetermined locations (e.g., using a screen printer), and sense dies and integrated circuit (IC) elements are prepared for attachment. The sense dies are then attached to the PCB at the desired locations via the adhesive pattern. If the adhesives are thermally curable, the PCB is then thermally cured in an oven at a temperature safe for the dies. Following the curing, the cured die-on-PCB assembly is sent to a plasma cleaning system to remove unwanted exposed adhesives. After the cleaning, an interconnecting step is performed in which die contacts are wire bonded to circuitry on the PCB in accordance with a standard wire bonding process, in which conductive materials such as gold wires are used. Block 520 illustrates the active assembling of sense dies with corresponding PCBs, and the sensor electrical assembly is then ready for the next step.

Still referring to FIG. 5A, block 530A illustrates an example process for manufacturing a molded ring structure and assembling the molded ring structure with the PCB assembly generated via the process illustrated in block 520.

The block 530 process can also be understood with reference to the structure in FIGS. 3A and 3B. This process typically takes place at a specifically configured attach station. As illustrated in Block 530A, the process comprises steps for premixing silicone rubber materials A and B in a syringe which is ultimately dispensed into the interior of the molded ring structure. The molded ring structure itself is molded, and the sealing structure is molded and adhered (with an adhesive) to the exterior of the molded ring structure. The molded ring structure (e.g., as illustrated in FIGS. 1-3B) is then attached to the PCB assembly 370 with an adhesive 350 applied along the rim of the bottom of the ring 250. The adhesive is then cured (e.g., thermally cured in an oven) to securely attach the molded ring structure relative to the PCB. In the following step, silicone rubber mixture 360 prepared earlier in the syringe is dispensed into the plastic molded ring 250 from its top side, filling the hollow ring and submerging the sense die 380 as shown in FIG. 3B. Silicone rubber material 360 dispensed on top and inside the ring is then vacuum degassed, thermally-cured in an oven before sent to the next stage to be finally packaged in block 540.

The block 540 process of FIG. 5A describes the sensor final packaging process in which the sense die/PCB assembly, and the silicone over molded micro ring structure are all formed as one pressure sensor.

Figure 5B:
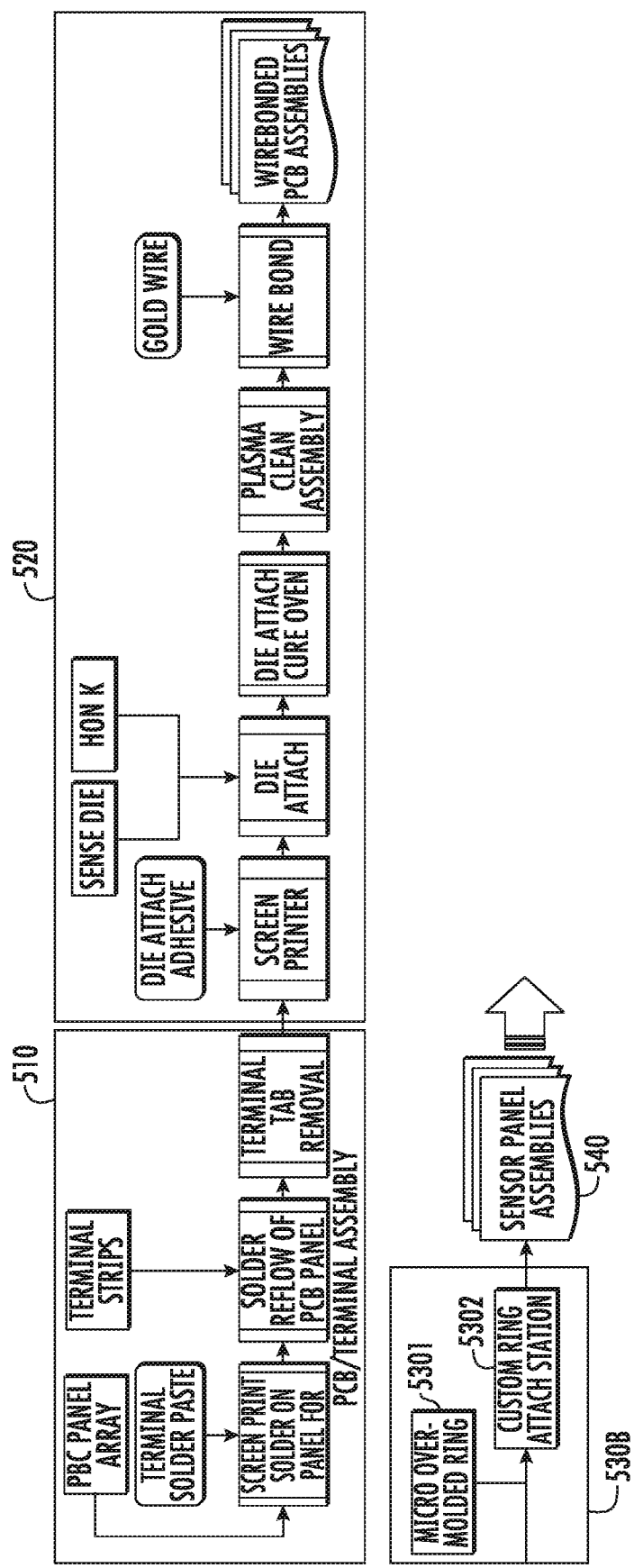
FIG. 5B shows a schematic block diagram of the process flow for fabricating the directly coupled micro pressure sensor assembly, according to FIG. 4.

FIG. 5B shows a schematic block diagram of the process flow for fabricating the directly coupled micro pressure sensor assembly, according to FIG. 4. The FIG. 5B process flow includes four major blocks:

Block 510 illustrates the process assembling an example substrate with terminal;

Block 520 illustrates the process of attaching a sense die relative to the substrate;

Block 530B illustrates the process of securing the seal structure (also referred to as a "gel ring") with the tubular housing; and Block 540 illustrates the process of packaging the sensor.

Processes for assembling a PCB (as illustrated in block 510), attaching a sense die to PCB (as illustrated in block 520), and packaging the sensor (as illustrated in block 540) are described above in reference to FIG. 5A, therefore the similar descriptions for these three blocks 510, 520, and 540, will not be repeated in description of FIG. 5B herein.

However, in accordance with certain embodiments, a process of securing a molded ring structure relative to the PCB may be provided in accordance with the process described in block 530B of FIG. 5B in lieu of that discussed in reference to block 530A of FIG. 5A. As illustrated in block 530B, the sealing structure and/or pressure-transmitting media may be secured onto the molded ring structure by overmolding, without any adhesive or separate attachment mechanisms. As illustrated at block 5301, the sealing structure (e.g., sealing structure 120 as illustrated in FIGS. 1-3B) or pressure-transmitting media (e.g., pressure-transmitting media 310 as illustrated in FIG. 4) is overmolded onto the at least one sidewall. The resulting molded ring structure (molded ring structure 100 or molded ring structure 500) may then be attached relative to the PCB via a specifically configured ring attaching station, as reflected at block 5302. In certain embodiments, the molded ring structure may be adhered to the PCB (as discussed in reference to FIGS. 3A-3B), or the molded ring structure may be attached via snap-fit attachment mechanisms, such as described in reference to FIG. 4.

The final step of packaging the sensor disclosed in block 540 also includes calibration of pressure signals over standard, and adjustment of over-molding silicone position.

In conclusion, embodiments discussed herein provide element structures that may be configured for use in a variety of pressure sensors. The designs are cost effective at least in part because the sensing structures could be built in large quantities with easy to work with materials, which may be suitable for generating disposable pressure sensors. The compact size of the designs would allow this sensors to be applied for disposable medical and biological fluid measurements. In addition these sensors are more readily accommodates high volume production to achieve low cost solutions.

What is claimed is:

1. A pressure sensor, comprising:
a ring structure encircling a sense die, wherein a bottom end of the ring structure is adhered to a substrate; and
a pressure-transmitting media overmolded over an upper end of the ring structure so as to have a first portion of the pressure-transmitting media positioned external to the ring structure and adjacent to the upper end of the ring structure and a second portion of the pressure-transmitting media positioned within an interior of the ring structure and in contact with a sense surface of sense die,
wherein the pressure-transmitting media transmits a received external pressure to the sense surface of the sense die to generate an output signal from the sense die, wherein a processor converts the output signal into a pressure reading.

2. The pressure sensor as in claim 1, wherein the pressure-transmitting media and the ring structure are each characterized as being opaque.

3. The pressure sensor as in claim 1, wherein the pressure-transmitting media is interference fit with the ring structure.

4. The pressure sensor as in claim 1, wherein the sense die is a flip chip designed silicon chip.

5. The pressure sensor as in claim 4, wherein the silicon chip is outfitted with a Wheatstone bridge circuit of piezoresistive sensors.

6. The pressure sensor as in claim 1, wherein an internal diameter of the ring structure is between about 1 mm and about 10 mm.

7. The pressure sensor as in claim 1, wherein the sense die is configured to measure pressures within a range of about—10 PSI to about 200 PSI.

8. The pressure sensor as in claim 1, wherein the pressure-transmitting media defines a sealing structure to create a fluid-tight seal with a fluid conduit.

9. A method of making a pressure sensor, comprising:
overmolding a pressure-transmitting media around an upper end of a ring structure so as to have a first portion of the pressure-transmitting media positioned external to the ring structure and adjacent to the upper end of the ring structure and a second portion of the pressure-transmitting media positioned within an interior of the ring structure, wherein the pressure-transmitting media creates a fluid-tight seal with a fluid conduit; and
adhering a lower end of the ring structure with the substrate to encircle the sense die;
wherein the pressure-transmitting media is in contact with a sense die to transmit an external pressure to the sense die to generate an output signal, wherein a processor converts the output signal into a pressure reading.

10. The method of making a pressure sensor of claim 9, wherein the ring structure and the pressure-transmitting media are each opaque.

11. The method of making a pressure sensor as in claim 9, wherein the sense die comprises piezoresistive sensors arranged in Wheatstone bridge circuit.

12. A pressure sensor, comprising:
a substrate electrically connected to a sense die, wherein the substrate comprises a plurality of mating holes; and
a ring structure comprising:
a silicone material disposed over the ring structure, wherein the silicon material is overmolded to an exterior of the ring structure to form a seal with the ring structure and fills an interior of the ring structure, and wherein the silicon material is overmolded to the exterior of the ring structure so as to have a first portion of the silicone material positioned external to the ring structure and adjacent to an upper end of the ring structure and a second portion of the silicone material positioned within an interior of the ring structure;
a plurality of flexible legs formed at a bottom of the ring structure;
wherein the plurality of flexible legs are inserted into the plurality of mating holes such that the ring structure encircles the sense die; and
wherein a top surface of the silicone material receives the external pressure and transmits the external pressure to the sense surface of the sense die to generate an output signal on the sense die, wherein a processor converts the output signal into a pressure reading.

13. The pressure sensor of claim 12, wherein the plurality of flexible legs is snap-fit into the plurality of mating holes.

14. The pressure sensor as in claim 12, wherein the silicone material and the ring structure are each opaque.

15. The pressure sensor as in claim 12, wherein the silicone material is formed from mixing two silicone rubbers.

16. The pressure sensor as in claim 12, wherein the sense die is a silicon chip outfitted with piezoresistive sensors arranged in Wheatstone bridge circuit.

17. The pressure sensor as in claim 12, wherein a height of the ring structure is between about 1 mm to about 10 mm.

18. The pressure sensor as in claim 12, wherein an internal diameter of the ring structure is between about 1 mm to about 5 mm.

19. The pressure sensor as in claim 12, wherein the sense die measures pressure in a range of about—10 PSI to about 200 PSI.

* * * * *